July 12, 1966  C. B. BRAHM  3,260,921
INVERTER CLAMPING CIRCUIT
Filed Oct. 26, 1962
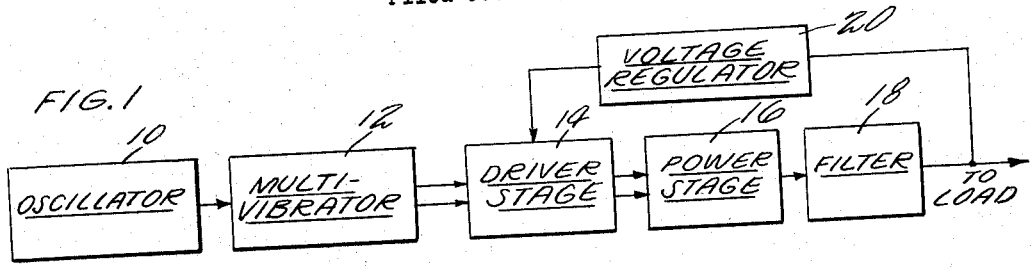
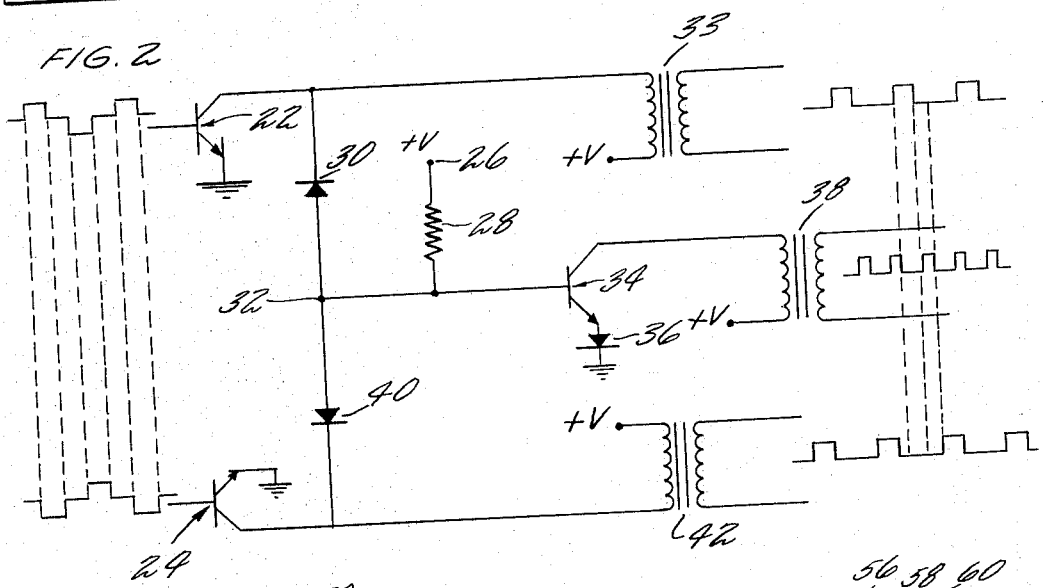
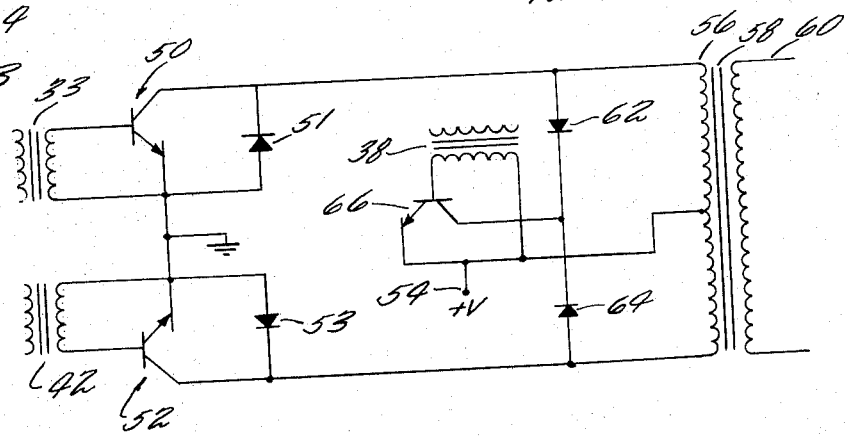
INVENTOR
CHARLES B. BRAHM
BY Donald J. Bradley
AGENT

United States Patent Office

3,260,921
Patented July 12, 1966

3,260,921
INVERTER CLAMPING CIRCUIT
Charles B. Brahm, Ellington, Conn., assignor to United Aircraft Corporation, East Hartford, Conn., a corporation of Delaware
Filed Oct. 26, 1962, Ser. No. 233,228
8 Claims. (Cl. 321—45)

This invention relates to a static inverter for converting direct current into alternating current, and particularly to a circuit which may be used as the output power stage for a static inverter.

In the past, three-phase systems of power were usually generated by mechanical rotating components or from A.C. by using passive components. This resulted in considerable variation in the displacement between the phases. More recently, with the advent of semiconductor technology, three-phase voltages have been generated by static inverters, which produce alternating current from direct current without an operational dependence on relative mechanical motion between component parts. In the aircraft and missile field, semiconductor static inverters have advantages in efficiency, weight, size, voltage regulation, frequency regulation and reliability. Thyratron inverters are also used, but are relatively unsuited for aircraft applications.

Most static inverters, whether single phase or three phase, consist of four basic subcircuits, an oscillator, a driver, a power stage, and a filter. A control loop is often provided to regulate the output voltage, and, in a three-phase system, to also regulate the relative phase of the outputs.

The oscillator in a static inverter has the function of providing the correct nominal frequency to the drive stage and, in a three-phase inverter, of providing the nominal 120° phase difference between the outputs. It is also responsible for the frequency regulation since the subsequent circuitry usually has no effect on frequency.

Control of the output voltage amplitude is usually accomplished by means of time modulation of a switched waveform. Two basic types of modulation are used, "pulse-duration" modulation and "pulse-frequency" modulation. Pulse-duration modulation refers to the time variation of the positive and negative going portions of a voltage in order to change the fundamental voltage component of the filtered output wave. The output waveform is known as a "quasi-square wave." To eliminate heavy filtering in the inverter output, the dwell angle is controlled to thus control the fundamental and the harmonic content of the wave. In pulse-frequency modulation, the pulses in a high-frequency output are spaced or modulated at a lower frequency, and after filtering only the lower frequency is present in the output.

The drive circuitry drives the transistors in the power stage. The oscillator provides the desired frequency reference to the drive stage, and the drive stage produces a waveform which will actuate the power transistors to produce the desired output voltage. The control of the output voltage usually takes place in the drive stage by means of the modulation techniques discussed.

Filter design of static inverter output filters is complicated and often difficult, and will not be discussed here except to state that the filter must convert the power stage output into the desired, usually sinusoidal, ouput voltage regardless of the load or power factor.

The power stage design is very important since most of the dissipated power is lost here. Most inverters are of the parallel type inverters where a pair of transistors in the power stage are operated in push-pull. Each transistor in a parallel inverter is subjected to twice the supply voltage during all, or part, of its time in cutoff. This is caused by the induced voltage in its half of the output transformer, which in turn is induced by the current in the other half of the transformer. This adds to the supply voltage, causing large peak voltages to appear across the transformer. This in turn results in a high harmonic content in the output wave, and heavy filtering is required to convert the high harmonic output into a sure wave.

This invention describes a power stage circuit which clamps the output of the power transformer during the period when neither power transistor in the push-pull power stage is conducting to thereby eliminate the peak voltage across the output transformer, thus lowering the harmonic content of the power stage output and reducing the filtering requirements.

It is therefore an object of this invention to provide a novel output stage for static inverters.

Another object of this invention is a transistor power circuit in which a pair of transistors are connected in push-pull relationship and a third transistor is connected in the circuit to conduct when neither power transistor is conducting.

A further object of this invention is a novel transistor circuit in which a switch is used to clamp the output of the circuit to thereby prevent excursions of the output voltage beyond preselected levels.

These and other objects of this invention will become readily apparent from the following detailed description of the drawings in which:

FIG. 1 shows in schematic in block diagram form one channel of a typical static inverter; and FIG. 2 is a circuit which may be used to actuate the output stage of the inverter; and FIG. 3 shows the novel inverter output stage of this invention.

Referring particularly to FIG. 1 which shows a typical inverter channel, oscillator 10, which may be a unijunction, relaxation oscillator or other type of oscillator, generates pulses at double the reference frequency. Since most inverter outputs are at 400 c.p.s., the oscillator frequency will be 800 c.p.s. The oscillator output is fed to multivibrator 12 which may be a bistable circuit which undergoes a change of state for each of the input 800 c.p.s. pulses. The multivibrator output will therefore be two 400 c.p.s. square waves, 180° apart. The multivibrator output is fed to a driver stage 14 where the pulses are operated upon and amplified to thereby produce a rectangular or quasi-square wave to drive output power stage 16. The output of the power stage is then fed to filter 18 where the power stage output is converted into a sine wave. The sine wave output is normally amplitude regulated by means of a voltage regulator circuit 20. The amplitude of the sine wave is compared with a reference signal, and if the output is different from the reference signal an error signal is fed back to driver stage 14 to vary the drive signal.

The operation of a typical static inverter including a voltage regulator is described in my copending application Serial No. 30,657, entitled "Three-Phase Static Inverter," filed May 20, 1960, and now Patent No. 3,144,-599, and assigned to the same assignee as this invention. In the referenced application it is shown that the multivibrator output is converted into a triangular wave by means of an integrator, and the triangular wave actuates the driver transistors. The error signal from the voltage regulator varies the D.C. bias of the triangular wave to thereby increase or decrease the switching time of the driver transistors and thus provide voltage regulation.

FIGURE 1 is representative of a typical static inverter, and the power stage of this invention may be used with any static inverter. The invention in its broadest form contemplates the use of clamping means to prevent output voltage excursions during the time that the power-stage transistors are not conducting.

FIGURE 2 shows a circuit which actuates the power stage. Referring to FIGURE 2, transistors 22 and 24, which may be the output transistors of driver 14, are actuated by pulses from the preceding stages, the pulses shown being in the form of quasi-square waves from the preceding stage, but it is apparent that other wave shapes may be used. In a typical inverter, the dwell time of the pulses and the exact shape of the pulses are regulated to provide an output from the driver transistors and consequently an input to the power stage which will produce an output from the power stage having the desired harmonic content.

As may be seen from the figure, the quasi-square waves are fed to the base terminals of transistors 22 and 24, the emitters of each transistor being grounded. The waves are phased 180° apart, and consequently transistors 22 and 24 will be actuated in push-pull fashion. Assuming that transistor 22 is turned on, current will flow from voltage source 26 through resistor 28, junction 32 and diode 30 through the transistor 22 to ground. Since the impedance of a conducting transistor is low, and since the voltage drop across diode 30 is approximately ½ volt, the voltage at junction 32 will be very close to ground. A transistor 34 has its base junction connected to junction 32, and the emitter of transistor 34 is connected to ground through a diode 36.

When transistor 22 conducts, an output is produced across the secondary winding of transformer 33, and the voltage at junction 32 will not be sufficient to turn transistor 34 on. When the voltage at the base of transistor 22 falls to a point which will turn transistor 22 off, no current will flow through resistor 28 and the voltage at junction 32 will swing positive, turning transistor 34 on. The collector of transistor 34 is connected to a source of positive voltage through transformer 38, and conduction of transistor 34 will produce an output across the secondary of transformer 38.

When the pulse and the base of transistor 24 turns transistor 24 on, a current will flow from source 26 through resistor 28, junction 32 and diode 40 to the transistor 24, and the voltage at junction 32 will again fall to ground. At this time transistor 34 will be turned off. Conduction of transistor 24 will produce an output across the secondary of transformer 42.

FIGURE 3 shows the power stage of the inverter. A pair of transistors 50 and 52 are connected in push-pull with the emitters of the transistors grounded. The collectors of each transistor are connected to a source of positive voltage 54 through primary winding 56 of output transformer 58. Secondary winding 60 is also connected with transformer 58. A pair of diodes 62 and 64 are connected across the primary winding 56, and a transistor 66 is connected between the junction of diodes 62 and 64 to the center tap of primary winding 56. Voltage source 54 is connected to the emitter of the transistor 66. Diodes 51 and 53 are connected across transistors 50 and 52 for reverse current protection.

Transistor 50 is actuated by the signal across the secondary winding of transformer 33 which results when drive transistor 22 is turned on. When transistor 50 conducts, the current flows from voltage source 54 through the upper half of primary winding 56 and through transistor 50 to ground, and an output voltage appears across secondary winding 60 as a result of the current flow through primary winding 56. When the pulse input to transistor 22 subsides, transistor 34 in the drive stage is turned on as previously described and the output across the secondary winding of transformer 38 turns on transistor 66. When transistor 66 conducts, the collector of transistor 50 is clamped to the source voltage 54 as will be described. Without transistor 66, when transistor 50 is turned off, the voltage across the upper half of primary winding 56 reverses because of the inductance of the transformer winding, and the voltage at the collector of transistor 50 will tend toward a positive voltage which is much larger than the voltage of source 54. With transistor 66 conducting, the collector of transistor 66 is held at the voltage of source 54 and now when the collector voltage of transistor 50 swings positive diode 62 will conduct when the collector voltage of transistor 50 reaches source voltage.

When the pulse at the base of transistor 24 turns this transistor on, the output across the secondary of transformer 42 turns transistor 52 on. At the same time transistor 34 is turned off, thus turning off transistor 66. When transistor 52 conducts, current flows from source 54 through the lower half of primary winding 56 through transistor 52 to ground. The polarity of the voltage across secondary winding 60 reverses. When transistor 52 is turned off, transistor 66 is turned on again as described to clamp the output voltage, and diode 64 conducts when the collector of transistor 52 attempts to become more positive than the source voltage 54 because of reverse voltage caused by the inductive effect of the primary 56.

Thus it can be seen that the inclusion of transistor 66 which is actuated when transistors 50 and 52 are turned off will prevent the voltage across the output from exceeding the source voltage, and will thus stabilize the output so that less filtering is required. The transistor 66 clamps the voltage to a value equivalent to the source voltage.

It is obvious that other arrangements may be used to clamp the voltage. For example, the transistor and diodes may be connected across the output transformer secondary winding to clamp the output voltage excursions rather than across the transformer primary winding as shown. Likewise two transistors and two diodes may be used. For example, two transistors may be connected in series opposition across the transformer primary winding with the emitters of the two transistors connected together to the primary winding center tap. A diode could be connected in series in the collector circuit of each transistor but is not essential. Another modification is connecting in series a transistor and a diode across the transformer secondary winding. Two of these series connections may be used to clamp both halves of the winding, the transistors and diodes conducting in opposite directions and being actuated at different times during the cycle.

While the invention has been shown in its preferred embodiment, it is obvious that modifications to the circuitry may be made without departing from the scope of the invention.

I claim:
1. An output clamping circuit for a pulse width modulated inverter comprising:
   a direct current source,
   a first semiconductor having a first control electrode and a first output electrode,
   a second semicoductor having a second control electrode and a second output electrode,
   an output transformer having a primary and a secondary winding,
   said primary winding having a center tap electrically connected to said direct current source,
   means for electrically connecting said primary winding across said first and second output electrodes,
   means for generating a constant frequency signal having variable pulses and variable dwell times and applying said constant frequency signal to said first and second control electrodes for rendering said semiconductors alternately conductive during said pulses and jointly nonconductive during said dwell times, and
   semiconductor means electrically connected across said primary winding for reducing the voltage across said primary winding in response to said constant frequency signal and during said dwell times when said primary winding voltage exceeds a predetermined value.

2. An output clamping circuit for a pulse width modulated inverter comprising:
a direct current source,
a first semiconductor having a first control electrode and a first output electrode,
a second semiconductor having a second control electrode and a second output electrode,
an output transformer having a primary and a secondary winding,
said primary winding having a center tap electrically connected to said direct current source,
means for electrically connecting said primary winding across said first and second output electrodes,
means for generating a constant frequency signal having variable pulses and variable dwell times and applying said constant frequency signal to said first and second control electrodes for rendering said semiconductors alternately conductive during said pulses and jointly nonconductive during said dwell times,
semiconductor means responsive to said constant frequency signal and electrically connected across said primary winding for reducing the voltage across said primary winding during said dwell times, and
biasing means including a reference voltage and connected to said semiconductor means for clamping said primary winding voltage to said reference voltage when both said first and second semiconductors are cut off by said constant frequency signal.

3. An output clamping circuit as in claim 2:
where said semiconductor means further includes means for returning the power represented by said excess primary voltage to said direct current source.

4. An output clamping circuit as in claim 3:
where said reference voltage is the voltage of said direct current source.

5. A clamping circuit for a pulse width modulated inverter comprising:
a direct current source,
a first semiconductor having a first control and a first output electrode,
a second semiconductor having a second control and a second output electrode,
driver transformer means electrically connected to said first and second output electrodes and said direct current source for producing a driver signal,
means for generating a quasi square wave having a constant frequency and having variable pulses and variable dwell times,
means for applying said quasi square wave signal to said first and second control electrodes for rendering said semiconductors alternately conductive during said pulses and jointly nonconductive during said dwell times,
means responsive to the conduction of said first and second semiconductors for generating a clamp pulsed signal having pulse durations corresponding to the nonconducting periods common to both said first and second semiconductors,
output means connected to said transformer secondary winding for amplifying said driver signal and producing an inverter output signal, and
means for synchronously applying said clamp pulse signal to said output means for reducing the inverter output signal excursions above a predetermined value.

6. A clamping circuit for a pulse width modulated inverter as in claim 5:
where said clamp pulse generating means includes a pair of series connected diodes having like terminals connected to a first common junction,
said series diode combination electrically connected across said first and second semiconductor output electrodes,
a third semiconductor having a third control electrode and a third output electrode, and
where said third control electrode is electrically connected to said first common junction whereby said third output electrode produces the clamp pulsed signal.

7. A clamping circuit for a pulse width modulated inverter as in claim 6 where said output means comprises:
a fourth semiconductor having a fourth control and a fourth output electrode,
a fifth semiconductor having a fifth control and a fifth output electrode,
where said fourth and fifth control electrodes are responsive to said driver signal,
an output transformer having output primary and output secondary windings,
said output primary winding further having a center tap electrically connected to said direct current source,
said fourth and fifth semiconductor output electrodes electrically connected across said output primary winding,
and where said means for applying said clamp pulse signal comprises:
a sixth semiconductor having a sixth control and a sixth output electrode,
a second pair of diodes in series combination connected across said output primary winding and having like terminals electrically connected to a second common junction,
said sixth control electrode responsive to a signal from said third output electrode,
said sixth output electrode electrically connected to said second common diode junction, and
means for applying said direct current source to said sixth semiconductor for reducing the voltage excursions of said second primary winding to a level substantially determined by the voltage of said direct current source.

8. In a pulse width modulated inverter for generating an alternating output, a first direct current source having an active terminal and a return terminal
an output transistor having base, emitter and collector electrodes,
an output transformer having a primary and a secondary winding,
said primary winding electrically connected across said collector electrode and said active terminal,
said emitter electrode electrically connected to said return terminal,
means for generating a pulse width modulated signal and applying said pulse width signal to said base electrode for rendering said output transistor conductive in a pulsed manner,
means responsive to said pulse width modulated signal for producing a clamping signal indicative of the nonconducting periods of said output transistor,
means for generating a second direct current source,
switching means electrically connected to said second direct current source, and said collector electrode and responsive to said clamping signal for clamping said collector to said second direct current source.

References Cited by the Examiner

UNITED STATES PATENTS 3,018,382  1/1962  Carroll et al. _____ 321—45
3,048,764  8/1962  Murphy _____ 321—45 X

FOREIGN PATENTS 1,114,927  10/1961  Germany.

JOHN F. COUCH, *Primary Examiner.*

LLOYD McCOLLUM, J. M. THOMSON, W. M. SHOOP, *Assistant Examiners.*